W. G. SHELTON.
AUTOMATIC ELECTRIC WINDER FOR SPRING MOTORS.
APPLICATION FILED NOV. 23, 1916.

1,217,843.  
Patented Feb. 27, 1917.

WITNESSES:  
René Bruino  
J. F. Wallace

INVENTOR  
William Gentry Shelton  
By Attorneys,  
Fraser, Tink & Myers

UNITED STATES PATENT OFFICE.

WILLIAM GENTRY SHELTON, OF NEW YORK, N. Y.

AUTOMATIC ELECTRIC WINDER FOR SPRING-MOTORS.

1,217,843.

Specification of Letters Patent.

Patented Feb. 27, 1917.

Application filed November 23, 1916. Serial No. 133,062.

*To all whom it may concern:*

Be it known that I, WILLIAM GENTRY SHELTON, a citizen of the United States of America, residing in the borough of Manhattan, city, county, and State of New York, have invented certain new and useful Improvements in Automatic Electric Winders for Spring-Motors, of which the following is a specification.

This invention relates to automatic means for controlling the current of an electric motor, particularly when connected with the winding up of some mechanism, as for instance, with the winding up of a spring motor. The invention is peculiarly useful in connection with an automatic winder for the spring motor of a talking machine, and is adapted to close the circuit of the electric motor upon the running down of the spring of the spring motor and the opening of such circuit upon the winding up of such spring to a predetermined tension.

In the drawings accompanying this application,—

Figure 1:
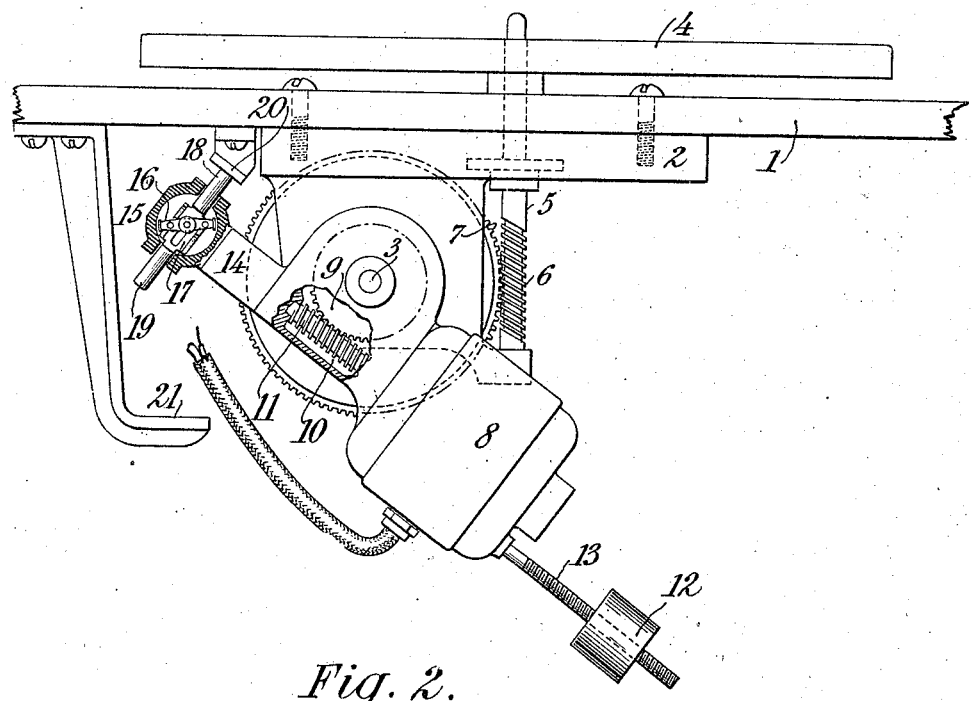
Figure 1 is an elevational view partly in section of my invention shown in connection with certain parts of a talking machine, the parts being shown in the closed circuit position.

Referring to the drawings, 1 indicates the table of a talking machine, to the underside of which table is fastened the bed plate 2 of a spring motor. For the purposes of illustration, the motor and associated parts are shown as of a well known commercial type. The winding shaft of the spring motor is indicated by the reference character 3. A talking machine turntable 4 is illustrated upon a spindle 5 having thereon a worm 6 meshing with a worm wheel 7 in operative relation with the spring of the motor.

In the operation of talking machines, it is quite desirable that the spring of the motor be kept sufficiently wound up to rotate the record disk, and it is further desirable that the tension of the spring be maintained between certain predetermined limits of tension, and that the spring be automatically wound up when it falls below a predetermined minimum less than that at which the spring should be maintained. It has been proposed to operate talking machines by means of electric motors for certain records. However, a spring motor gives more desirable results. My improved device, made the subject matter of this application, is particularly designed for automatically keeping the spring at the desired tension. To accomplish this result I provide an electric motor indicated in a general way by the reference character 8. The frame of the motor is mounted to oscillate upon the winding shaft 3, which shaft is shown having fast upon it a worm wheel 9 meshing with a worm 10, formed on the motor shaft 11. The organization of parts is such that upon the current circuit of the motor being closed, the rotary part of the motor will rotate the shaft 11 and by means of the worm 10 and worm wheel 9 the winding shaft will be rotated and the spring thereby wound up. The parts are so adjusted as to weight that when the spring of the spring motor runs down sufficiently to reduce the tension a predetermined amount, the weight of the motor and its associated parts causes the motor to assume the position indicated in Fig. 1. When the winding motor winds up the spring and gives it a certain predetermined amount of tension, the spring causes the motor to turn on the axis of the shaft 3 and assume the position illustrated in Fig. 2.

For the purpose of effecting the desired adjustment or regulation of tensions, an adjustable weight is provided. This is illustrated in the form of a weight 12 running upon a screwthreaded spindle 13 extending from the rear end of the electric motor casing.

Figure 2:
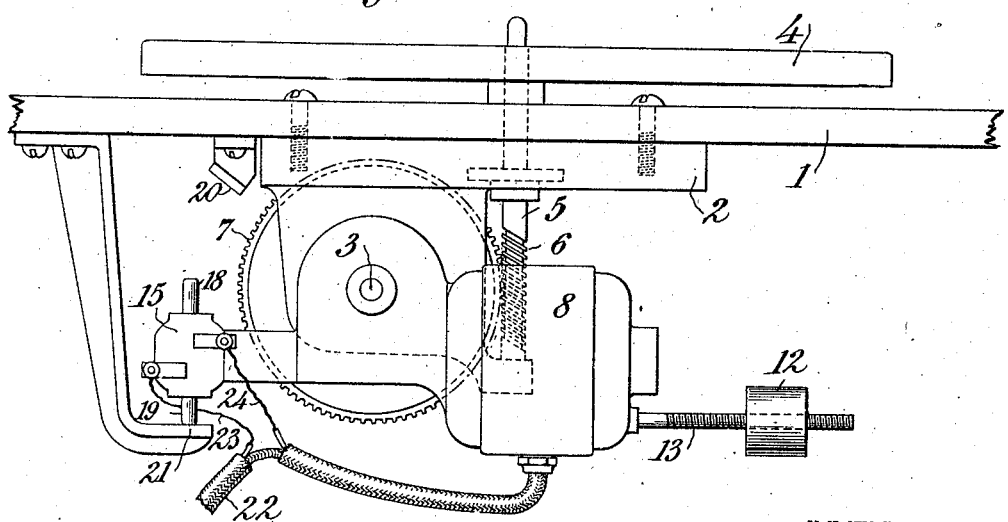
Fig. 2 is a similar view showing the parts in the position assumed when the spring of the spring motor is wound up and the circuit closed.

The circuit of the motor is controlled by the change in position of the motor and its associated parts. A switch or circuit closer is so arranged in relation to the movable parts of the motor that an excursion caused by lowering of the tension of the spring closes the circuit, and an excursion caused by the tightening of the spring opens the circuit. The casing of the motor 8 is shown having an extension 14 beyond the shaft 3, which extension is shown carrying a commercial form of through switch 15. The interior construction of this switch is illustrated in Fig. 1 wherein the switch lever is indicated at 16, this switch lever being operated in the well known manner by means of a plate 17 having fast with it two pins 18 and 19. The pin 18 is operated by the motor assuming the run down or Fig. 1 position by engagement of a tappet or actuator 20, and the pin 19 is engaged by the motor assuming the wound up or Fig. 2 position by engaging a tappet or actuator 21. The switch as illustrated in Fig. 1 is shown in its circuit closing position.

Of course, it is obvious that the actuators for the switch or circuit closer may be varied in position for the purpose of adjusting the timing of the functioning of the various parts. It is also apparent that the form of switch shown is for the purpose of illustrating the invention. As a matter of fact the entire showing of the drawings is illustrative but, nevertheless, of a practicable and efficient form of mechanism.

Although the invention is rather simple, it may be desirable to briefly outline its operation. It is assumed that the cable 22 is connected up with some suitable source of electric current and that the parts are in the Fig. 2 position. Operation of the talking machine permits the spring thereof to run down and its tension to be lessened, the tension of the spring being the force holding the parts in the Fig. 2 position. Upon the weakening of the tension of the spring of the spring motor, the winding device oscillates upon its axis and the parts assume the Fig. 1 position, the pin 18 striking the abutment 20 and forcing the plate 17 in a downward direction thereby moving the switch lever to close the circuit of the motor through the wires 23, 24. The parts remain in this position until the spring of the motor almost reaches the maximum desired tension, which maximum limit is adjusted by adjusting the weight 12 upon the screw rod 13. When the tension of the spring which is being wound overbalances the winding motor apparatus, the parts assume the Fig. 2 position, the pin 19 engaging the abutment 20 and forcing the plate 17 in an upward direction and moving the switch lever 16 into an open circuit position, thereby cutting off the current of the motor, which current remains cut off until such time as the tension of the spring is again lowered to the predetermined minimum.

I claim—

1. In a device of the character specified, the combination with a spring motor having a winding shaft, of an electric motor oscillatably mounted upon such winding shaft, connections between the electric motor shaft and the winding shaft, whereby the rotation of the electric motor rotates the winding shaft, and an electrical switch for opening and closing the circuit of the said electric motor upon the respective excursions or oscillation thereof.

2. In an automatic electric winder for a spring motor, the combination with a pivotally supported electric winding motor, means for connecting the motor shaft with the winding shaft of a spring motor, whereby upon the weakening of the tension of the spring of said spring motor, the winding motor assumes one position, and upon the tightening of the tension of the spring to a predetermined extent, the winding motor assumes another position, an electric switch in the circuit of the said winding motor, and means for actuating the switch at the limit of the respective excursions for closing and opening the circuit respectively.

3. In an automatic electric winder for a spring motor, the combination with a pivotally supported electric winding motor, means for connecting the motor shaft with the winding shaft of a spring motor, whereby upon the weakening of the tension of the spring of said spring motor, the winding motor assumes one position, and upon the tightening of the tension of the spring to a predetermined extent, the winding motor assumes another position, an electric switch in the circuit of the said winding motor, means for actuating the switch at the limit of the respective excursions for closing and opening the circuit respectively, and means for adjusting the winder to vary the amount of spring tension to which it will respond.

4. In an automatic electric winder for a spring motor, the combination with a pivotally supported electric winding motor, means for connecting the motor shaft with the winding shaft of a spring motor, whereby upon the weakening of the tension of the spring of said spring motor, the winding motor assumes one position, and upon the tightening of the tension of the spring to a predetermined extent, the winding motor assumes another position, an electric switch in the circuit of the said winding motor, means for actuating the switch at the limit of the respective excursions for closing and opening the circuit respectively, and an adjustable weight carried by the winding motor for varying the amount of spring tension to which the winder will respond.

In witness whereof, I have hereunto signed my name.

WILLIAM GENTRY SHELTON.

Witness:
 CHAS. LYON RUSSELL.